United States Patent
Takeguchi (10) Patent No.: US 9,178,236 B2
(45) Date of Patent: Nov. 3, 2015

(54) POLYMER ELECTROLYTE FUEL CELL

(75) Inventor: Shinsuke Takeguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 264 days.

(21) Appl. No.: 13/818,863

(22) PCT Filed: Jul. 25, 2012

(86) PCT No.: PCT/JP2012/004728
§ 371 (c)(1),
(2), (4) Date: Feb. 25, 2013

(87) PCT Pub. No.: WO2013/018317
PCT Pub. Date: Feb. 7, 2013

(65) Prior Publication Data
US 2013/0157165 A1    Jun. 20, 2013

(30) Foreign Application Priority Data

Aug. 2, 2011  (JP) .................. 2011-169236

(51) Int. Cl.
*H01M 8/10*    (2006.01)
*H01M 4/86*    (2006.01)
(Continued)

(52) U.S. Cl.
CPC .......... *H01M 8/1002* (2013.01); *H01M 8/0247* (2013.01); *H01M 8/0267* (2013.01);
(Continued)

(58) Field of Classification Search
CPC ............ H01M 8/1002; H01M 8/0247; H01M 2008/1095; H01M 8/0267; H01M 4/8605; H01M 8/0258; H01M 2/14; Y02E 60/521
USPC ............. 429/413, 415, 480, 483, 532, 514
See application file for complete search history.

(56) References Cited

U.S. PATENT DOCUMENTS

| 6,015,633 A | 1/2000 | Carlstrom, Jr. et al. |
| 7,531,266 B2 | 5/2009 | Sano et al. |

(Continued)

FOREIGN PATENT DOCUMENTS

| JP | 2003-068318 | * | 3/2003 | ............ H01M 8/02 |
| JP | 2003-068318 A | | 3/2003 | |

(Continued)

OTHER PUBLICATIONS

PDF files of original Japanese text and English machine translation of JP 2003-068318.*

(Continued)

*Primary Examiner* — Jonathan Jelsma
*Assistant Examiner* — Omar Kekia
(74) *Attorney, Agent, or Firm* — McDermott Will & Emery LLP (57) ABSTRACT

A polymer electrolyte fuel cell of the present invention includes a membrane-electrode assembly (5) and separators (6A and 6B). Each of the electrodes (4A and 4B) includes a catalyst layer (2A, 2B) and a gas diffusion layer (3A, 3B). One main surface of the catalyst layer contacts the polymer electrolyte membrane (1). The separator (6A) includes a peripheral portion (16A) and a portion (26A) other than the peripheral portion. The peripheral portion (16A) of the separator (6A) is formed in an annular shape when viewed from a thickness direction of the separator (6A) and is a region including a portion located on an inner side of the outer periphery of the separator (6A). The separator (6A) is configured such that a porosity of the peripheral portion (16A) is higher than that of the portion (26A) other than the peripheral portion.

11 Claims, 6 Drawing Sheets

(51) Int. Cl.
*H01M 8/02* (2006.01)
*H01M 2/14* (2006.01)

(52) U.S. Cl.
CPC .............. *H01M 2/14* (2013.01); *H01M 4/8605* (2013.01); *H01M 8/0258* (2013.01); *H01M 2008/1095* (2013.01); *Y02E 60/521* (2013.01)

(56) References Cited

U.S. PATENT DOCUMENTS

| | | |
|---|---|---|
| 2003/0165730 A1 | 9/2003 | Dohle et al. |
| 2004/0110049 A1 | 6/2004 | Shimotori et al. |
| 2005/0064261 A1 | 3/2005 | Breault et al. |
| 2005/0118490 A1 | 6/2005 | Sano et al. |
| 2009/0162717 A1* | 6/2009 | Nakagawa et al. ............. 429/30 |

FOREIGN PATENT DOCUMENTS

| | | | | |
|---|---|---|---|---|
| JP | 2003-100323 A | | 4/2003 | |
| JP | 2004-146245 | * | 5/2004 | .............. H01M 8/02 |
| JP | 2004-146245 A | | 5/2004 | |
| JP | 2004-241367 A | | 8/2004 | |
| JP | 2005-071635 A | | 3/2005 | |
| JP | 2005-235418 A | | 9/2005 | |
| JP | 2005-276731 A | | 10/2005 | |
| JP | 2005-285636 A | | 10/2005 | |
| JP | 2006-286323 A | | 10/2006 | |
| JP | 2006-351491 A | | 12/2006 | |
| JP | 2011-017055 A | | 1/2011 | |

OTHER PUBLICATIONS

PDF files of original Japanese text and English machine translation of JP 2004-146245.*

International Search Report mailed Oct. 16, 2012 issued in corresponding International Application No. PCT/JP2012/004728.

Extended European Search Report issued in European Application No. 12820465.8, dated Jan. 5, 2015.

* cited by examiner

POLYMER ELECTROLYTE FUEL CELL

RELATED APPLICATIONS

This application is the U.S. National Phase under 35 U.S.C. §371 of International Application No. PCT/JP2012/004728, filed on Jul. 25, 2012, which in turn claims the benefit of Japanese Application No. 2011-169236, filed on Aug. 2, 2011, the disclosures of which Applications are incorporated by reference herein.

TECHNICAL FIELD

The present invention relates to the structure of a polymer electrolyte fuel cell.

BACKGROUND ART

A polymer electrolyte fuel cell (hereinafter referred to as a "PEFC") causes an electrochemical reaction between a hydrogen-containing fuel gas and an oxygen-containing oxidizing gas, such as air, to generate electric power and heat at the same time. A unit cell (cell) of the PEFC includes a MEA (Membrane-Electrode Assembly), gaskets, and electrically-conductive plate-shaped separators. The MEA is constituted by a polymer electrolyte membrane and a pair of gas diffusion electrodes (an anode and a cathode). The PEFC is commonly formed such that a plurality of cells are stacked, these stacked cells are sandwiched between end plates, and the end plates and the cells are fastened by fastening members (see PTL 1, for example).

Therefore, the vicinity of a portion (hereinafter referred to as an "outer peripheral contact portion of the polymer electrolyte membrane") of the polymer electrolyte membrane receives a stress (fastening pressure) higher than a stress applied to the other potion of the polymer electrolyte membrane, the portion contacting the outer periphery of a catalyst layer of the gas diffusion electrode. In addition, by repeatedly performing start-up and stop operations of the PEFC, a tensile stress and a compressive stress are repeatedly applied to the polymer electrolyte membrane. Especially, these stresses are strongly applied to the outer peripheral contact portion of the polymer electrolyte membrane, and the problem is that damages, such as distortions and cracks, tend to occur at this outer peripheral contact portion portion.

CITATION LIST

Patent Literature

PTL 1: Japanese Laid-Open Patent Application Publication No. 2003-68318

SUMMARY OF INVENTION

Technical Problem

The present invention was made to solve the above problems, and an object of the present invention is to provide a polymer electrolyte fuel cell capable of suppressing a deterioration factor at a portion where the polymer electrolyte membrane easily deteriorates and also capable of suppressing a decrease in cell performance.

Solution to Problem

To solve the above conventional problems, a polymer electrolyte fuel cell according to the present invention includes: a membrane-electrode assembly including a polymer electrolyte membrane and a pair of electrodes sandwiching the polymer electrolyte membrane; and a pair of separators each formed in a plate shape and having electrical conductivity, wherein: each of the separators includes a peripheral portion and a portion other than the peripheral portion; when viewed from a thickness direction of the separator, the peripheral portion of the separator is formed in an annular shape and is a region located on an inner side of an outer periphery of the separator; and the separator is configured such that a porosity of the peripheral portion is higher than that of the portion other than the peripheral portion.

As described above, in the polymer electrolyte fuel cell, a high stress is applied to a portion of the polymer electrolyte membrane, the portion being opposed to a peripheral edge portion of the electrode when viewed from the thickness direction of the separator. With this, this portion of the polymer electrolyte membrane is crushed. Thus, the cross leakage amount of reactant gas increases, and radicals are generated from hydrogen peroxide that is a reaction by-product. Then, it is thought that the generated radicals attack the polymer electrolyte membrane, so that the polymer electrolyte membrane is damaged and deteriorated, and the performance of the fuel cell decreases.

Then, in the polymer electrolyte fuel cell according to the present invention, each of the separators is configured such that when viewed from the thickness direction of the separator, the porosity of the peripheral portion of the separator is higher than that of the portion other than the peripheral portion of the separator. With this, a part of the water flowing through the water channel can be supplied to the electrode through the peripheral portion. Thus, the hydrogen peroxide generated by the cross leakage of the reactant gas is dissolved in the water supplied to the electrode. With this, the hydrogen peroxide can be moved to a position away from the polymer electrolyte membrane. On this account, the radicals generated from the hydrogen peroxide can be prevented from attacking the polymer electrolyte membrane. Thus, in the polymer electrolyte fuel cell according to the present invention, the durability of the polymer electrolyte membrane can be improved, and the decrease in the cell performance can be suppressed.

The above object, other objects, features and advantages of the present invention will be made clear by the following detailed explanation of preferred embodiments with reference to the attached drawings.

Advantageous Effects of Invention

The polymer electrolyte fuel cell of the present invention can improve the durability while suppressing the deterioration of the polymer electrolyte membrane and can suppress the performance deterioration of the fuel cell.

DESCRIPTION OF EMBODIMENTS

Hereinafter, preferred embodiments of the present invention will be explained in reference to the drawings. In the drawings, the same reference signs are used for the same or corresponding components, and a repetition of the same explanation is avoided. Moreover, in the drawings, only components necessary to explain the present invention are shown, and the other components may be omitted. Further, the present invention is not limited to the embodiments below.

Embodiment 1

A polymer electrolyte fuel cell according to Embodiment 1 of the present invention includes: a membrane-electrode assembly including a polymer electrolyte membrane and a pair of electrodes sandwiching the polymer electrolyte membrane; and a pair of separators each formed in a plate shape and having electrical conductivity, wherein: each of the separators includes a peripheral portion and a portion other than the peripheral portion; when viewed from a thickness direction of the separator, the peripheral portion of the separator is formed in an annular shape and is a region located on an inner side of an outer periphery of the separator; and the separator is configured such that a porosity of the peripheral portion is higher than that of the portion other than the peripheral portion.

The polymer electrolyte fuel cell according to Embodiment 1 may further include a gasket provided at a peripheral edge portion of the polymer electrolyte membrane.

In the polymer electrolyte fuel cell according to Embodiment 1, each of the electrodes may be formed such that when viewed from the thickness direction of the separator, an outer periphery of the electrode is located on the inner side of the outer periphery of the separator, and the peripheral portion of the separator may be formed in an annular shape such that when viewed from the thickness direction of the separator, an outer periphery of the peripheral portion of the separator is located between the outer periphery of the separator and the outer periphery of the electrode, and an inner periphery of the peripheral portion of the separator is located between the outer periphery of the electrode and the rib portion closest to the outer periphery of the electrode.

In the polymer electrolyte fuel cell according to Embodiment 1, each of the electrodes may include a catalyst layer and a gas diffusion electrode, groove-shaped reactant gas channels and rib portions each located between the groove-shaped reactant gas channels may be formed on at least one of one main surface, contacting the gas diffusion layer, of the separator and one main surface, contacting the separator, of the gas diffusion layer, and a groove-shaped water channel may be formed on the other main surface of at least one of the pair of separators.

In the polymer electrolyte fuel cell according to Embodiment 1, the water channel may be formed such that when viewed from the thickness direction of the separator, a part of the water channel overlaps the peripheral portion of the separator.

Further, in the polymer electrolyte fuel cell according to Embodiment 1, the peripheral portion of the separator may be formed such that when viewed from the thickness direction of the separator, an outer periphery of the peripheral portion of the separator is located between a portion located on an outer side by 5 mm from the outer periphery of the electrode and the outer periphery of the electrode, and an inner periphery of the peripheral portion of the separator is located between the outer periphery of the electrode and a portion located on the inner side by 5 mm from the outer periphery of the electrode.

Hereinafter, one example of the polymer electrolyte fuel cell according to Embodiment 1 of the present invention will be explained in reference to the drawings.

Configuration of Fuel Cell Stack

Figure 1:
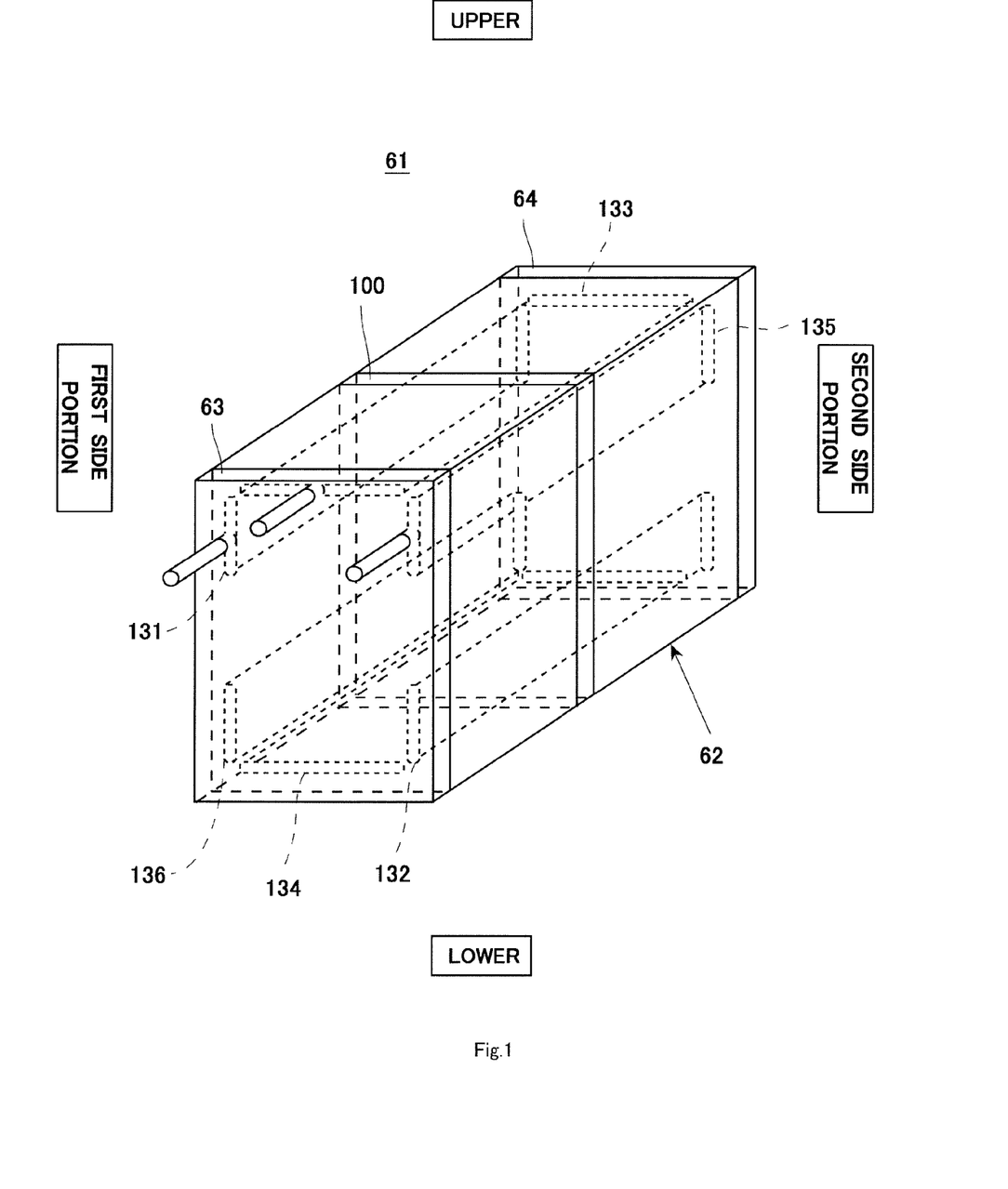
FIG. 1 is a perspective view schematically showing a schematic configuration of a fuel cell stack including a polymer electrolyte fuel cell according to Embodiment 1 of the present invention.

FIG. 1 is a perspective view schematically showing a schematic configuration of a fuel cell stack including a polymer electrolyte fuel cell (hereinafter simply referred to as a "fuel cell") according to Embodiment 1 of the present invention. In FIG. 1, an upper-lower direction of the fuel cell stack corresponds to an upper-lower direction of the drawing.

As shown in FIG. 1, a fuel cell stack 61 according to Embodiment 1 of the present invention includes a cell stack body 62. The cell stack body 62 is formed by stacking a plurality of fuel cells 100 in a thickness direction of the fuel cell 100. End plates 63 and 64 are respectively provided on both ends of the cell stack body 62. A current collector and an insulating plate are provided between the end plate 63 and the cell stack body 62, and a current collector and an insulating plate are provided between the end plate 64 and the cell stack body 62 (not shown). The cell stack body 62 and the like are fastened by fastening members, not shown.

A fuel gas supply manifold 131 is formed at an upper portion of one side portion (a left side portion in the drawing; hereinafter referred to as a "first side portion") of the cell stack body 62 so as to penetrate in a stack direction of the fuel cells 100 of the cell stack body 62, and a cooling water discharge manifold 136 is formed at a lower portion of the first side portion. An oxidizing gas supply manifold 133 is formed on the upper inner side of the fuel gas supply manifold 131 of the first side portion of the cell stack body 62 so as to penetrate in the stack direction of the fuel cells 100 of the cell stack body 62. Similarly, an oxidizing gas discharge manifold 134 is formed on the lower inner side of the cooling water discharge manifold 136 so as to penetrate in the stack direction of the fuel cells 100 of the cell stack body 62. Further, a cooling water supply manifold 135 is formed at an upper portion of the other side portion (a right side portion in the drawing; hereinafter referred to as a "second side portion") of the cell stack body 62 so as to penetrate in the stack direction of the fuel cells 100 of the cell stack body 62, and a fuel gas discharge manifold 132 is formed at a lower portion of the second side portion so as to penetrate in the stack direction of the fuel cells 100 of the cell stack body 62.

Then, suitable pipes are respectively provided at the manifolds. With this, a fuel gas, an oxidizing gas, and cooling water are supplied to and discharged from the fuel cell stack 61 through the suitable pipes. In Embodiment 1, the fuel cell 100 adopts a so-called inner manifold type fuel cell stack. However, the present embodiment is not limited to this, and an outer manifold type fuel cell stack may be adopted.

Configuration of Polymer Electrolyte Fuel Cell

Next, the configuration of the polymer electrolyte fuel cell according to Embodiment 1 of the present invention will be explained in reference to FIG. 2.

Figure 2:
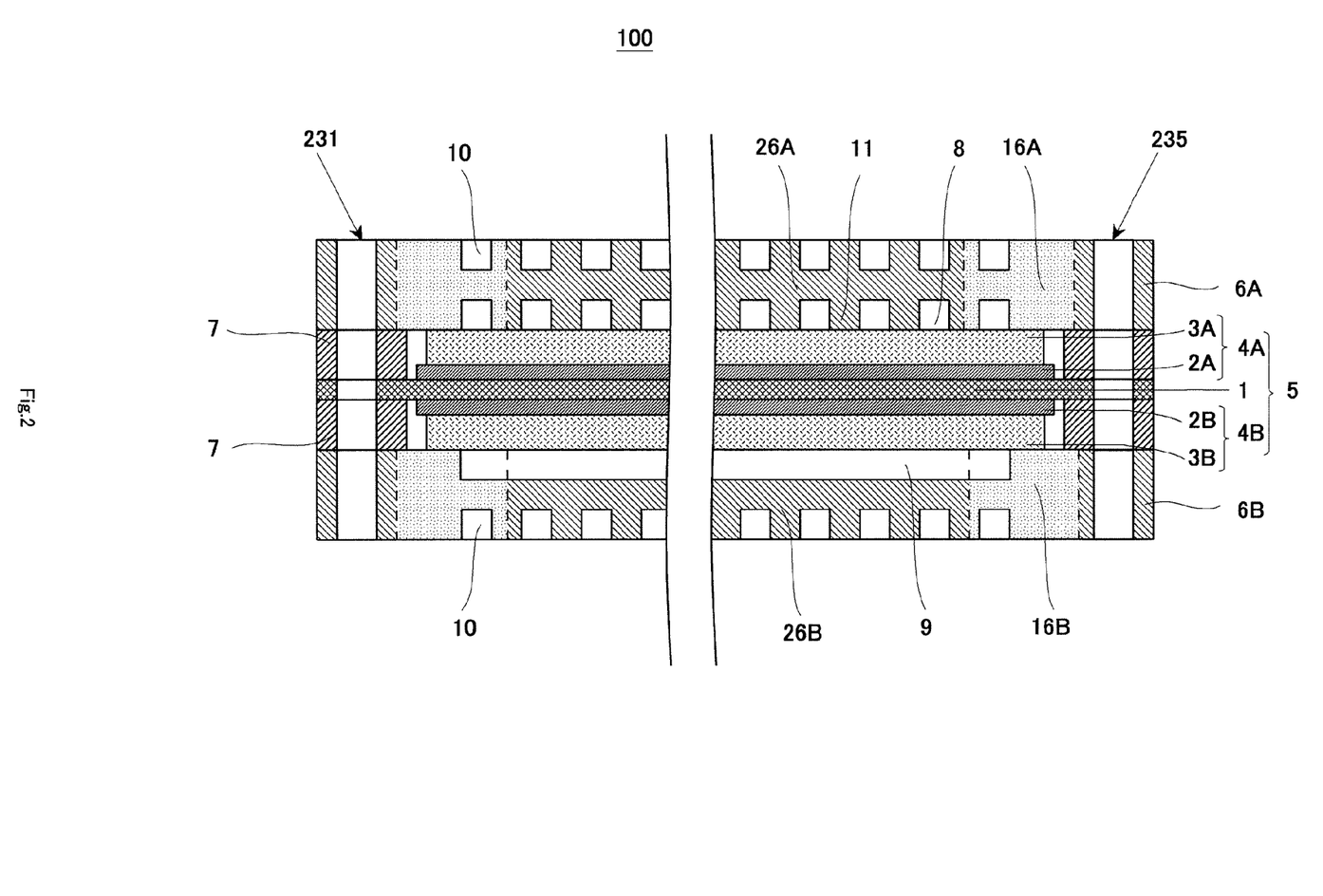
FIG. 2 is a cross-sectional view schematically showing a schematic configuration of the polymer electrolyte fuel cell of the fuel cell stack shown in FIG. 1.

FIG. 2 is a cross-sectional view schematically showing a schematic configuration of the fuel cell of the fuel cell stack shown in FIG. 1.

As shown in FIG. 2, the fuel cell 100 according to Embodiment 1 includes a MEA (Membrane-Electrode Assembly) 5, gaskets 7, an anode separator 6A, and a cathode separator 6B.

The MEA 5 includes a polymer electrolyte membrane 1 which selectively transports hydrogen ions, an anode electrode 4A, and a cathode electrode 4B. The polymer electrolyte membrane 1 has a substantially quadrangular shape (herein, a rectangular shape). The anode electrode 4A and the cathode electrode 4B are respectively provided on both surfaces of the polymer electrolyte membrane 1 such that each of the anode electrode 4A and the cathode electrode 4B is located on the inner side of a peripheral edge portion of the polymer electrolyte membrane 1. Respective manifold holes, such as a fuel gas supply manifold hole 231 and a cooling water supply manifold hole 235, are formed on the peripheral edge portion of the polymer electrolyte membrane 1 so as to penetrate in the thickness direction.

The anode electrode 4A includes an anode catalyst layer 2A and an anode gas diffusion layer 3A. The anode catalyst layer 2A is provided on one main surface of the polymer electrolyte membrane 1 and contains catalyst supporting carbon and a polymer electrolyte adhered to the catalyst supporting carbon. The catalyst supporting carbon is carbon powder (electrically-conductive carbon particles) supporting a platinum-based metal catalyst (electrode catalyst). The anode gas diffusion layer 3A has both gas permeability and electrical conductivity. The anode catalyst layer 2A is provided such that one main surface thereof contacts the polymer electrolyte membrane 1, and the anode gas diffusion layer 3A is provided on the other main surface of the anode catalyst layer 2A.

Similarly, the cathode electrode 4B includes a cathode catalyst layer 2B and a cathode gas diffusion layer 3B. The cathode catalyst layer 2B is provided on the other main surface of the polymer electrolyte membrane 1 and contains catalyst supporting carbon and a polymer electrolyte adhered to the catalyst supporting carbon. The catalyst supporting carbon is carbon powder (electrically-conductive carbon particles) supporting a platinum-based metal catalyst (electrode catalyst). The cathode gas diffusion layer 3B is provided on the cathode catalyst layer 2B and has both gas permeability and electrical conductivity. The cathode catalyst layer 2B is provided such that one main surface thereof contacts the polymer electrolyte membrane 1, and the cathode gas diffusion layer 3B is provided on the other main surface of the cathode catalyst layer 2B.

In Embodiment 1, when viewed from a thickness direction of the cathode separator 6B, the anode catalyst layer 2A is formed such that an outer end thereof is located on an outer side of an outer end of the anode gas diffusion layer 3A (the outer end thereof protrudes from the outer end of the anode gas diffusion layer 3A), and the cathode catalyst layer 2B is formed such that an outer end thereof is located on an outer side of an outer end of the cathode gas diffusion layer 3B. However, the present embodiment is not limited to this. The anode catalyst layer 2A may be formed such that the outer end thereof is located on the inner side of the anode gas diffusion layer 3A, and the cathode catalyst layer 2B may be formed such that the outer end thereof is located on the inner side of the cathode gas diffusion layer 3B.

A pair of gaskets 7 each made of fluorocarbon rubber and having a doughnut shape are respectively provided around the anode electrode 4A and cathode electrode 4B of the MEA 5 (to be precise, around the anode gas diffusion layer 3A and the cathode gas diffusion layer 3B) so as to sandwich the polymer electrolyte membrane 1. With this, the fuel gas and the oxidizing gas are prevented from leaking to the outside of the cell and are also prevented from being mixed with each other in the fuel cell 100. The manifold holes, such as the fuel gas supply manifold hole 231 and the cooling water supply manifold hole 235, that are through holes extending in the thickness direction are formed on peripheral edge portions of the gaskets 7.

The anode separator 6A and the cathode separator 6B each having the electrical conductivity are provided to sandwich the MEA 5 and the gaskets 7. With this, the MEA 5 is mechanically fixed. In addition, when a plurality of fuel cells 100 are stacked in the thickness direction, the MEAs 5 are electrically connected to one another. For the anode separator 6A and the cathode separator 6B, a mixture of electrically-conductive particles, which excel in thermal conductivity and electrical conductivity, and a binder resin may be used.

The anode separator 6A includes a peripheral portion 16A and a portion 26A other than the peripheral portion 16A and is configured such that a porosity of the peripheral portion 16A is higher than that of the portion 26A. Similarly, the cathode separator 6B includes a peripheral portion 16B and a portion 26B other than the peripheral portion 16B and is configured such that a porosity of the peripheral portion 16B is higher than that of the portion 26B. Details of the peripheral portion 16A, the peripheral portion 16A, the portion 26A, and the portion 26B will be described later.

A groove-shaped fuel gas channel 8 through which the fuel gas flows is formed on one main surface (hereinafter referred to as an "inner surface") of the anode separator 6A, the main surface contacting the anode electrode 4A. A groove-shaped cooling water channel (water channel) 10 through which the cooling water flows is formed on the other main surface (hereinafter referred to as an "outer surface") of the anode separator 6A. Similarly, a groove-shaped oxidizing gas channel 9 through which the oxidizing gas flows is formed on one main surface (hereinafter referred to as an "inner surface") of the cathode separator 6B, the main surface contacting the cathode electrode 4B. A groove-shaped cooling water channel 10 through which the cooling water flows is formed on the other main surface (hereinafter referred to as an "outer surface") of the cathode separator 6B.

Each of the fuel gas channel 8, the oxidizing gas channel 9, and the cooling water channel 10 is formed in an arbitrary shape, and for example, may be formed in a so-called straight shape, a serpentine shape, or a spiral shape. The cooling water channel 10 may be formed on at least one of the outer surface of the anode separator 6A and the outer surface of the cathode separator 6B. As in the present embodiment, the cooling water channel 10 may be formed on each of the outer surface of the anode separator 6A and the outer surface of the cathode separator 6B.

Further, portions each between grooves constituting the fuel gas channel 8 form first rib portions contacting the anode electrode 4A. Similarly, portions each between grooves constituting the oxidizing gas channel 9 form second rib portions 12 contacting the cathode electrode 4B.

With this, the fuel gas and the oxidizing gas are respectively supplied to the anode electrode 4A and the cathode electrode 4B, so that electricity and heat are generated by the reaction between these gases. In addition, the generated heat is recovered by causing the cooling water to flow through the cooling water channel 10.

The fuel cell 100 configured as above may be used as a unit cell (cell). Moreover, the fuel cells 100 may be used as the fuel cell stack 61 by stacking a plurality of fuel cells 100.

Configuration of Separator

Next, the configurations of the anode separator 6A and the cathode separator 6B will be explained in more detail in reference to FIGS. 2 and 3. Since the configuration of the anode separator 6A is the same as that of the cathode separator 6B, the following will explain the configuration the cathode separator 6B, and an explanation of the configuration of the anode separator 6A is omitted.

Figure 3:
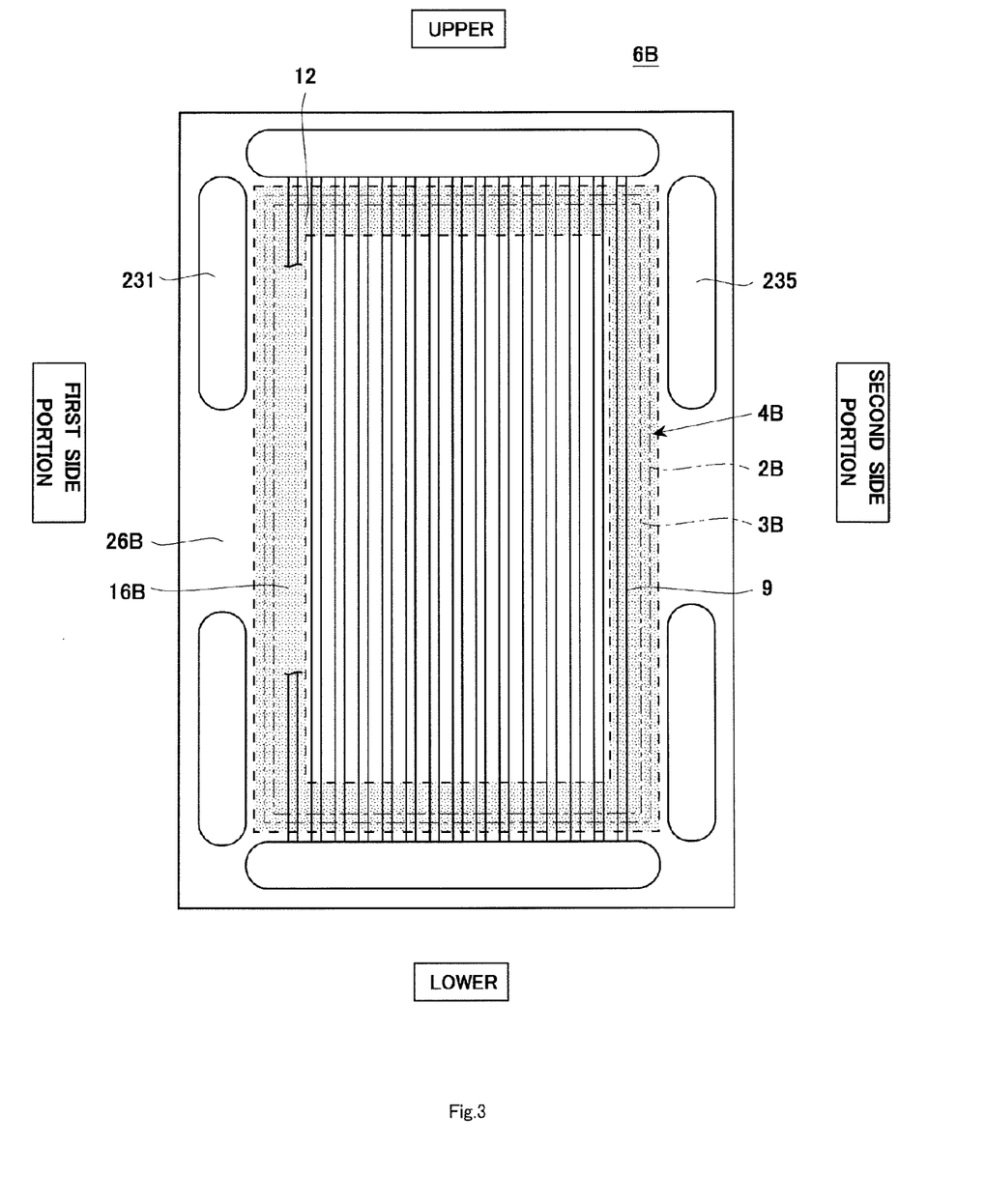
FIG. 3 is a front view schematically showing a schematic configuration of an inner surface of a cathode separator of the fuel cell shown in FIG. 2.

FIG. 3 is a front view schematically showing a schematic configuration of the inner surface of the cathode separator of the fuel cell shown in FIG. 2. In FIG. 3, an upper-lower direction of the cathode separator 6B corresponds to an upper-lower direction of the drawing, and the peripheral portion 16B of the cathode separator 6B is shown by hatching.

As shown in FIGS. 2 and 3, the cathode separator 6B includes the peripheral portion 16B and the portion (central portion) 26B. The peripheral portion 16B of the cathode separator 6B is formed in an annular shape when viewed from the thickness direction of the cathode separator 6B.

The peripheral portion 16B is formed such that the outer periphery thereof is located between the outer periphery of the cathode separator 6B and the cathode electrode 4B, and the inner periphery thereof is located between the outer periphery of the cathode electrode 4B and the second rib portion 12 closest to the outer periphery of the cathode electrode 4B.

In other words, the peripheral portion 16B is formed such that when viewed from the thickness direction of the cathode separator 6B, the outer periphery thereof is located between a portion located on an outer side by 5 mm from the outer periphery of the cathode electrode 4B and the outer periphery of the cathode electrode 4B, and the inner periphery thereof is located between the outer periphery of the cathode electrode 4B and a portion located on the inner side by 5 mm from the outer periphery of the electrode.

Here, the outer periphery of the cathode electrode 4B may indicate the outer periphery of the cathode catalyst layer 2B or the outer periphery of the cathode gas diffusion layer 3B. In a case where the outer periphery of the cathode catalyst layer 2B is located on an outer side of the outer periphery of the cathode gas diffusion layer 3B as shown in FIG. 2, the peripheral portion 16B may be formed such that the outer periphery thereof is located between the outer periphery of the cathode separator 6B and the outer periphery of the cathode catalyst layer 2B, and the inner periphery thereof is located between the outer periphery of the cathode gas diffusion layer 3B and the second rib portion 12 closest to the outer periphery of the cathode gas diffusion layer 3B.

In a case where the inner manifold type fuel cell stack is adopted as in the present embodiment, it is preferable that in order to prevent the leakage of the reactant gas and the cooling water, the outer periphery of the peripheral portion 16B be located between each manifold hole and the cathode electrode 4B. In the present embodiment, the peripheral portion 16B is formed such that a distance between the outer periphery and the inner periphery is constant. However, the present embodiment is not limited to this, and the peripheral portion 16B may be formed such that the distance between the outer periphery and the inner periphery is not constant.

As shown in FIG. 2, the cooling water channel 10 of the anode separator 6A is formed such that a part thereof overlaps the peripheral portion 16A when viewed from the thickness direction of the anode separator 6A. Similarly, the cooling water channel 10 of the cathode separator 6B is formed such that a part thereof overlaps the peripheral portion 16B when viewed from the thickness direction of the cathode separator 6B. With this, a part of the cooling water flowing through the cooling water channel 10 is easily supplied through the peripheral portion 16A to the anode electrode 4A. Similarly, a part of the cooling water flowing through the cooling water channel 10 is easily supplied through the peripheral portion 16B to the cathode electrode 4B.

Method of Producing Separator

Next, a method of producing the anode separator 6A and the cathode separator 6B will be explained in reference to FIGS. 2 and 3.

As described above, each of the anode separator 6A and the cathode separator 6B can be produced by using electrically-conductive particles and resin. Examples of the electrically-conductive particles are graphite, carbon black, and activated carbon. These materials may be used alone, or a plurality of materials may be used in combination. The form of the above carbon material may be a powder form, a fibrous form, or a particle form. Examples of the resin are thermosetting resin, such as phenol resin or epoxy resin, and/or thermoplastic resin, such as polyphenylene resin.

Then, each of the anode separator 6A and the cathode separator 6B may be directly produced by metallic molding using a mixture of the electrically-conductive particles and the resin or may be produced by forming a flat plate and then forming the reactant gas channel and the like by machine work. Further, the anode separator 6A may be formed in such a manner that the peripheral portion 16A is produced in advance, the peripheral portion 16A is placed in a mold, and a raw material is poured into the mold. Similarly, the cathode separator 6B may be formed in such a manner that the peripheral portion 16B is produced in advance, the peripheral portion 16B is placed in the mold, and the raw material is poured into the mold.

In this case, the electrically-conductive particles each having a larger particle diameter than the electrically-conductive particles used for the portion (central portion) 26A are placed at a portion corresponding to the peripheral portion 16A. With this, the porosity of the peripheral portion 16A can be set to be higher than that of the portion 26A. Similarly, the electrically-conductive particles each having a larger particle diameter than the electrically-conductive particles used for the portion 26B are placed at a portion corresponding to the peripheral portion 16B. With this, the porosity of the peripheral portion 16B can be set to be higher than that of the portion 26B.

The amount of raw material (the electrically-conductive particles and the resin) poured to the portion corresponding to the portion 26A is set to be larger than that poured to the portion corresponding to the peripheral portion 16A. With this, the porosity of the peripheral portion 16A can be set to be higher than that of the portion 26A. Similarly, the amount of raw material (the electrically-conductive particles and the resin) poured to the portion corresponding to the portion 26B is set to be larger than that poured to the portion corresponding to the peripheral portion 16B. With this, the porosity of the peripheral portion 16B can be set to be higher than that of the portion 26B.

Each of the porosity of the anode separator 6A and the porosity of the cathode separator 6B may be set in a range from 1 to 99%. The anode separator 6A is configured such that the porosity of the peripheral portion 16A is higher than that of the portion 26A. Specifically, the anode separator 6A may be configured such that the porosity of the peripheral portion 16A is higher than that of the portion 26A by, for example, 5% or more, or the porosity of the peripheral portion 16A is higher than that of the portion 26A by 10% or more, 20% or more, or 30% or more.

Similarly, the cathode separator 6B is configured such that the porosity of the peripheral portion 16B is higher than that of the portion 26B. Specifically, the cathode separator 6B may be configured such that the porosity of the peripheral portion 16B is higher than that of the portion 26B by, for example, 5% or more, or the porosity of the peripheral portion 16B is higher than that of the portion 26B by 10% or more, 20% or more, or 30% or more.

The porosity of the anode separator 6A and the porosity of the cathode separator 6B can be measured by using a mercury porosimeter (produced by Shimadzu Corporation, Autopore III9410) in a pressure range of 0.50 to 60,000 Psia.

Operational Advantages of Fuel Cell

In the fuel cell 100 according to Embodiment 1 configured as above, the porosity of the peripheral portion 16A of the anode separator 6A is set to be higher than that of the portion 26A. With this, a part of the cooling water flowing through the cooling water channel 10 can be supplied to the anode electrode 4A. The cooling water supplied to the anode electrode 4A moves toward the polymer electrolyte membrane 1 by an action, such as a capillary action.

With this, hydrogen peroxide generated by cross leakage of the reactant gas at the peripheral edge portion of the polymer electrolyte membrane 1 is dissolved in the cooling water supplied to the anode electrode 4A. Thus, the hydrogen peroxide can be moved to a position away from the polymer electrolyte membrane 1. Therefore, radicals generated from the hydrogen peroxide can be prevented from attacking the polymer electrolyte membrane 1. Thus, in the fuel cell 100 according to Embodiment 1, the durability of the polymer electrolyte membrane 1 can be improved, and the decrease in the cell performance can be suppressed.

Similarly, in the fuel cell 100 according to Embodiment 1, the porosity of the peripheral portion 16B of the cathode separator 6B is set to be higher than that of the portion 26B. With this, a part of the cooling water flowing through the cooling water channel 10 can be supplied to the cathode electrode 4B. The cooling water supplied to the cathode electrode 4B moves toward the polymer electrolyte membrane 1 by an action, such as the capillary action.

With this, the hydrogen peroxide generated by the cross leakage of the reactant gas at the peripheral edge portion of the polymer electrolyte membrane 1 is dissolved in the cooling water supplied to the cathode electrode 4B. Thus, the hydrogen peroxide can be moved to a position away from the polymer electrolyte membrane 1. Therefore, the radicals generated from the hydrogen peroxide can be prevented from attacking the polymer electrolyte membrane 1. Thus, in the fuel cell 100 according to Embodiment 1, the durability of the polymer electrolyte membrane 1 can be improved, and the decrease in the cell performance can be suppressed.

In Embodiment 1, the porosity of the peripheral portion 16A of the anode separator 6A is set to be higher than that of the portion 26A, and the porosity of the peripheral portion 16B of the cathode separator 6B is set to be higher than that of the portion 26B. However, the present embodiment is not limited to this. One of the porosity of the peripheral portion 16A of the anode separator 6A and the porosity of the peripheral portion 16A of the cathode separator 6B may be set to be higher than that of the portion other than the peripheral portion.

As long as the operational advantages of the present invention can be achieved, the peripheral portion 16A of the anode separator 6A may be configured such that the porosity of a part of the peripheral portion 16A of the anode separator 6A is lower than that of the other portion of the peripheral portion 16A. To be specific, as long as the operational advantages of the present invention can be achieved, the peripheral portion 16A of the anode separator 6A does not have to be formed in a completely annular shape.

Similarly, as long as the operational advantages of the present invention can be achieved, the peripheral portion 16B of the cathode separator 6B may be configured such that the porosity of a part of the peripheral portion 16B of the cathode separator 6B is lower than that of the other portion of the peripheral portion 16B. To be specific, as long as the operational advantages of the present invention can be achieved, the peripheral portion 16B of the cathode separator 6B does not have to be formed in a completely annular shape.

In the fuel cell 100 according to Embodiment 1, each of the anode electrode 4A and the cathode electrode 4B is formed such that when viewed from the thickness direction of the anode separator 6A, each of the outer periphery of the anode electrode 4A and the outer periphery of the cathode electrode 4B is located on the inner side of the outer periphery of the anode separator 6A (the polymer electrolyte membrane 1). However, the present embodiment is not limited to this. When viewed from the thickness direction of the anode separator 6A, the outer periphery of the polymer electrolyte membrane 1 may coincide with the outer periphery of the anode electrode 4A and/or the outer periphery of the cathode electrode 4B.

In this case, the peripheral portion 16A of the anode separator 6A may be formed in an annular shape such that when viewed from the thickness direction of the anode separator 6A, the outer periphery thereof is located between the outer periphery of the anode electrode 4A and the first rib portion 11 closest to the outer periphery of the anode electrode 4A, and the inner periphery thereof is located between the first rib portion 11 closest to the outer periphery of the anode electrode 4A and the first rib portion 11 second closest to the outer periphery of the anode electrode 4A. Moreover, the peripheral portion 16A of the anode separator 6A may be formed in an annular shape such that when viewed from the thickness direction of the anode separator 6A, the outer periphery thereof is located between the outer periphery of the anode electrode 4A and a portion located on the inner side by 5 mm from the outer periphery of the anode electrode 4A, and the inner periphery thereof is located between the portion located on the inner side by 5 mm from the outer periphery of the anode electrode 4A and a portion located at the inner side by 10 mm from the outer periphery of the anode electrode 4A.

Similarly, the peripheral portion 16B of the cathode separator 6B may be formed in an annular shape such that when viewed from the thickness direction of the cathode separator 6B, the outer periphery thereof is located between the outer periphery of the cathode electrode 4B and the second rib portion 12 closest to the outer periphery of the cathode electrode 4B, and the inner periphery thereof is located between the second rib portion 12 closest to the outer periphery of the cathode electrode 4B and the second rib portion 12 second closest to the outer periphery of the cathode electrode 4B. Moreover, the peripheral portion 16B of the cathode separator 6B may be formed in an annular shape such that when viewed from the thickness direction of the cathode separator 6B, the outer periphery thereof is located between the outer periphery of the cathode electrode 4B and a portion located on the inner side by 5 mm from the outer periphery of the cathode electrode 4B, and the inner periphery is located between the portion located on the inner side by 5 mm from the outer periphery of the cathode electrode 4B and a portion located on the inner side by 10 mm from the outer periphery of the cathode electrode 4B.

In the fuel cell 100 according to Embodiment 1, the fuel gas channel 8 is formed on the inner surface of the anode separator 6A. However, the present embodiment is not limited to this. The fuel gas channel 8 may be formed on a main surface (hereinafter referred to as an "outer surface") of the anode gas diffusion layer 3A, the main surface contacting the anode separator 6A, or the fuel gas channel 8 may be formed on each of the outer surface of the anode gas diffusion layer 3A and the inner surface of the anode separator 6A.

Similarly, in the fuel cell 100 according to Embodiment 1, the oxidizing gas channel 9 is formed on the inner surface of the cathode separator 6B. However, the present embodiment is not limited to this. The oxidizing gas channel 9 may be formed on a main surface (hereinafter referred to as an "outer surface") of the cathode gas diffusion layer 3B, the main surface contacting the cathode separator 6B, or the oxidizing gas channel 9 may be formed on each of the outer surface of the cathode gas diffusion layer 3B and the inner surface of the cathode separator 6B.

A through hole may be formed on the peripheral portion 16A of the anode separator 6A and/or the peripheral portion 16B of the cathode separator 6B so as to penetrate in the thickness direction. In this case, unlike each manifold hole, an opening area of the through hole is not large. The opening area of the through hole is small, that is, about several square micrometers to several hundred square micrometers. The same effects as in a case where the porosity of the peripheral portion 16A and/or the porosity of the peripheral portion 16B are increased can be obtained by providing the through hole.

Further, the fuel cell system on which the fuel cells 100 according to Embodiment 1 are mounted may be configured such that when activating the fuel cell system, the pressure of the cooling water flowing through the cooling water channel 10 is higher than each of the pressure of the fuel gas flowing through the fuel gas channel 8 and the pressure of the oxidizing gas flowing through the oxidizing gas channel 9. Specifically, for example, the fuel cell system may include the fuel cell 100 according to Embodiment 1, a fuel gas supply unit, an oxidizing gas supply unit, a cooling water supply unit, and a control unit, and the control unit may be configured to control the fuel gas supply unit, the oxidizing gas supply unit, and the cooling water supply unit such that the pressure of the cooling water flowing through the cooling water channel 10 is higher than each of the pressure of the fuel gas flowing through the fuel gas channel 8 and the pressure of the oxidizing gas flowing through the oxidizing gas channel 9.

In the fuel cell system configured as above, a part of the cooling water flowing through the cooling water channel 10 easily penetrate toward the inner surface of the separator. Thus, the operational advantages of the fuel cell 100 according to Embodiment 1 become significant.

Embodiment 2

The fuel cell according to Embodiment 2 of the present invention further includes a reinforcing member, and when viewed from the thickness direction of the separator, the reinforcing member is provided on a peripheral edge portion of the polymer electrolyte membrane.

Moreover, in the fuel cell according to Embodiment 2, the reinforcing member may be arranged such that a part of the reinforcing member contacts the other main surface of the catalyst layer and overlaps the catalyst layer when viewed from the thickness direction of the separator.

Further, in the fuel cell according to Embodiment 2, the reinforcing member may be made of resin.

Hereinafter, one example of the fuel cell according to Embodiment 2 of the present invention will be explained in reference to the drawings.

Configuration of Fuel Cell

Figure 4:
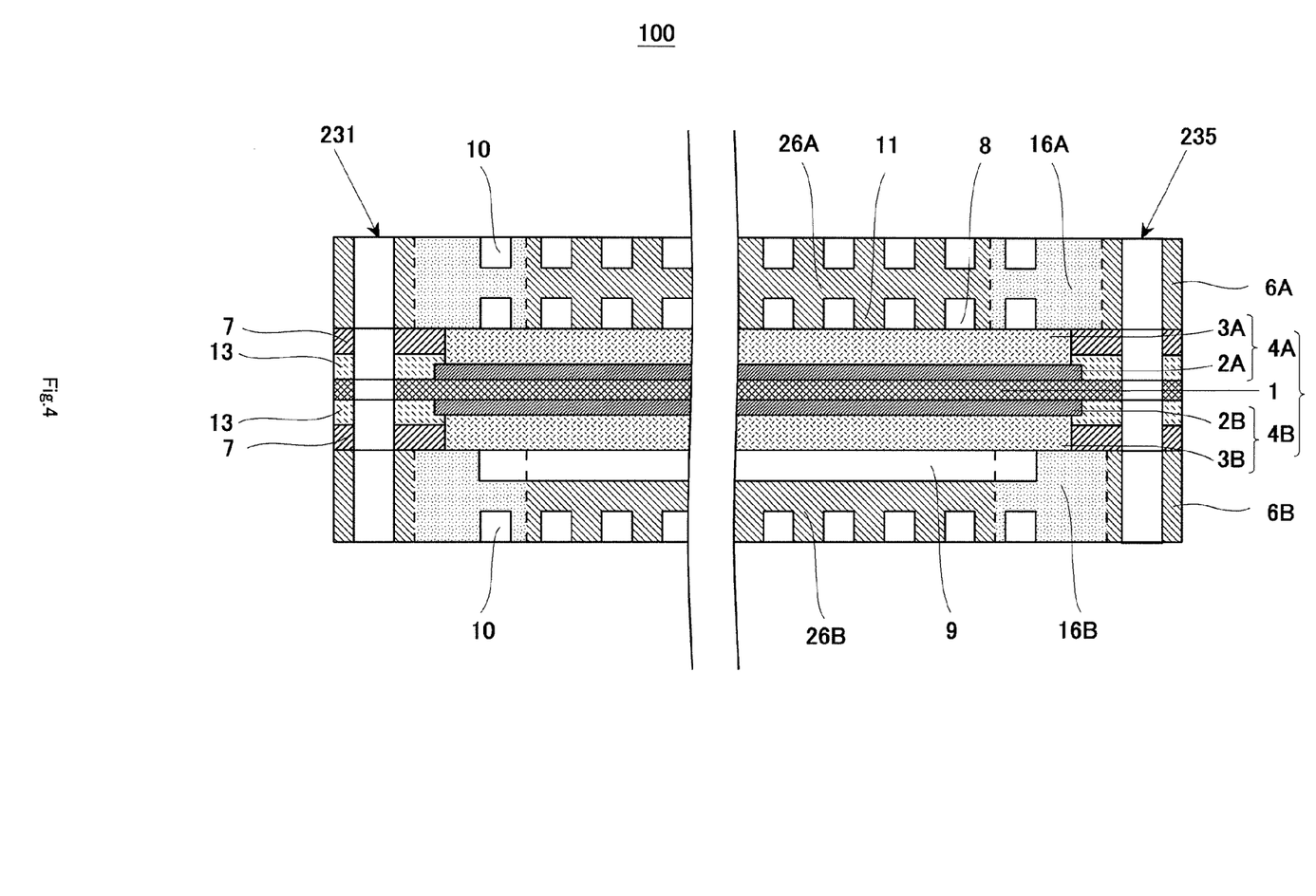
FIG. 4 is a cross-sectional view schematically showing a schematic configuration of the fuel cell according to Embodiment 2 of the present invention.

FIG. 4 is a cross-sectional view schematically showing a schematic configuration of the fuel cell according to Embodiment 2 of the present invention.

As shown in FIG. 4, the fuel cell 100 according to Embodiment 2 of the present invention is the same in basic configuration as the fuel cell 100 according to Embodiment 1 but is different from the fuel cell 100 according to Embodiment 1 in that reinforcing members 13 are further included. Specifically, each of the reinforcing members 13 is provided between the polymer electrolyte membrane 1 and the gasket 7 so as to be sandwiched therebetween.

The reinforcing member 13 is formed in a substantially rectangular shape and a doughnut shape when viewed from the thickness direction of the anode separator 6A. The reinforcing member 13 is arranged such that when viewed from the thickness direction of the anode separator 6A, the inner peripheral end thereof is located on the inner side of the outer peripheral end of the anode catalyst layer 2A or the outer peripheral end of the cathode catalyst layer 2B. In other words, the reinforcing member 13 is arranged such that when viewed from the thickness direction of the anode separator 6A, the inner peripheral portion thereof overlaps the outer peripheral portion of the anode catalyst layer 2A or the outer peripheral portion of the cathode catalyst layer 2B.

Further, the reinforcing member 13 is arranged such that a part thereof contacts the other main surface of the anode catalyst layer 2A or the other main surface of the cathode catalyst layer 2B. In other words, the reinforcing member 13 is arranged such that a part thereof is provided on the other main surface of the anode catalyst layer 2A or the other main surface of the cathode catalyst layer 2B.

Operational Advantages of Fuel Cell

Next, the operational advantages of the fuel cell 100 according to Embodiment 2 will be explained.

First, problems of the polymer electrolyte fuel cell disclosed in PTL 1 will be explained in reference to FIG. 6.

Figure 6:
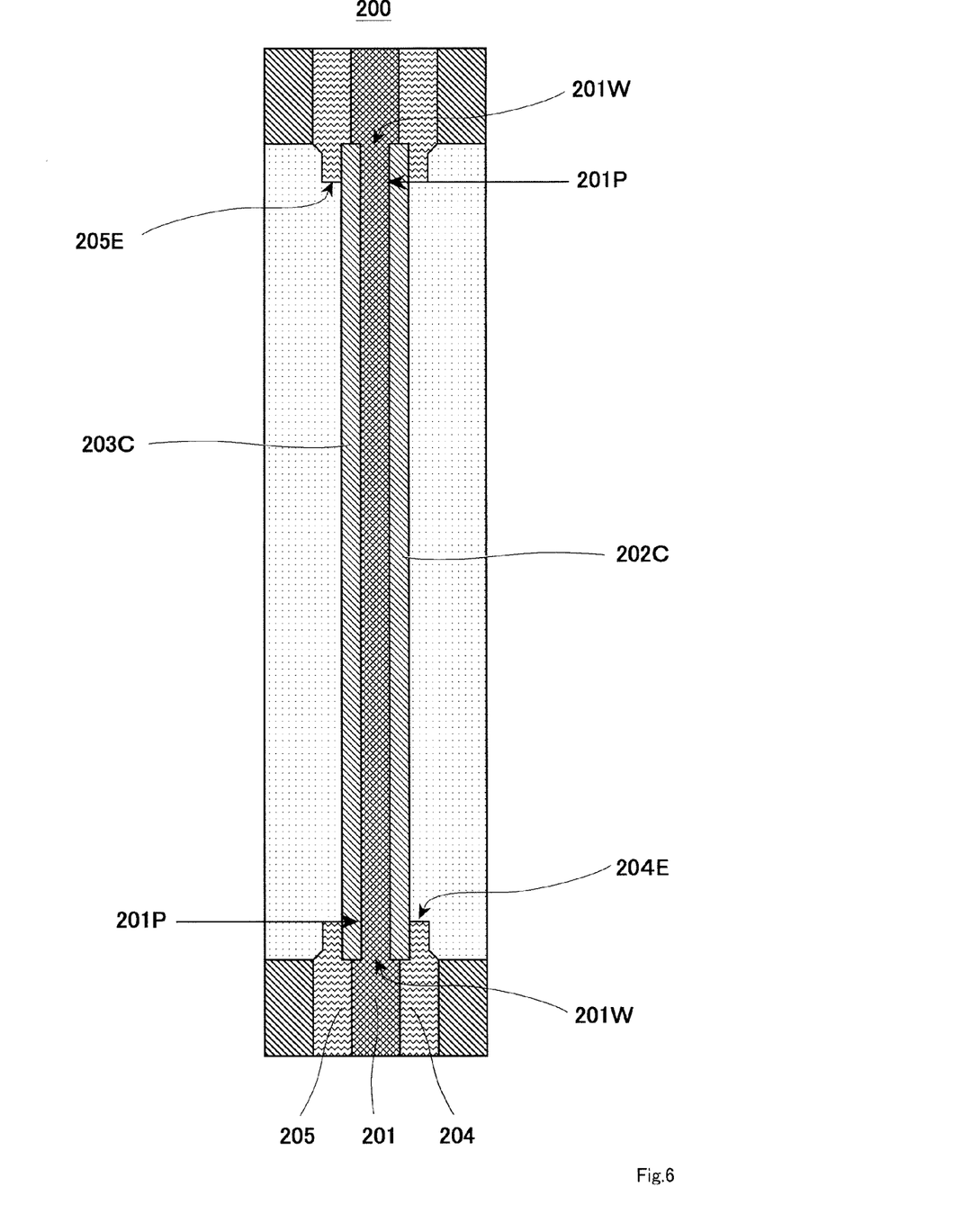
FIG. 6 is a schematic diagram showing a schematic configuration of a cell of a polymer electrolyte fuel cell disclosed in PTL 1.

FIG. 6 is a schematic diagram showing a schematic configuration of the cell of the polymer electrolyte fuel cell disclosed in PTL 1. In FIG. 6, a part is omitted.

The present inventors conducted an endurance test of a cell 200 of the polymer electrolyte fuel cell of PTL 1 shown in FIG. 6 and found problems below. To be specific, when viewed from the thickness direction of the cell 200, the thickness of a portion 201P of a polymer membrane 201 is smaller than that of the other portion of the polymer membrane 201, the portion 201P being opposed to (overlapping) inner end portions 204E and 205E of reinforcing members 204 and 205. This indicates that: the thickness of the portion 201P becomes smaller than that of the other portion of the polymer membrane 201 since the inner end portions 204E and 205E of the reinforcing members 204 and 205 apply a high stress to the portion 201P of the polymer membrane 201 via an oxygen electrode catalyst layer 202C and/or a fuel electrode catalyst layer 203C; and as a result, the cross leakage of the reactant gas at the portion 201P increases. To be specific, in the cell 200 disclosed in PTL 1, the cross leakage of the reactant gas occurs around the portion 201P of the polymer membrane 201, and the hydrogen peroxide is generated on the oxygen electrode catalyst layer 202C and/or the fuel electrode catalyst layer 203C by the leaked reactant gas. Then, the polymer membrane 201 is attached by the radicals generated by, for example, a Fenton reaction. As a result, the present inventors have found that the polymer membrane 201 deteriorates, and the decrease in the cell performance occurs.

However, in the fuel cell 100 according to Embodiment 2, the porosity of a portion (to be specific, the peripheral portion 16A) of the anode separator 6A is set to be higher than that of the portion 26A, the peripheral portion 16A being opposed to (overlapping) the inner periphery of the reinforcing member 13 when viewed from the thickness direction of the anode separator 6A. Therefore, a part of the cooling water flowing through the cooling water channel 10 can be supplied to the anode electrode 4A. The cooling water supplied to the anode electrode 4A moves toward the polymer electrolyte membrane 1 by an action, such as the capillary action.

With this, the hydrogen peroxide generated by the cross leakage of the reactant gas at the portion, opposed to (overlapping) the inner periphery of the reinforcing member 13, of the polymer electrolyte membrane 1 is dissolved in the cooling water supplied to the anode electrode 4A. Thus, the hydrogen peroxide can be moved to a position away from the polymer electrolyte membrane 1. Therefore, the radicals generated from the hydrogen peroxide can be prevented from attacking the polymer electrolyte membrane 1. Thus, in the fuel cell 100 according to Embodiment 2, the durability of the polymer electrolyte membrane 1 can be improved, and the decrease in the cell performance can be suppressed.

Similarly, in the fuel cell 100 according to Embodiment 2, the porosity of a portion (to be specific, the peripheral portion 16B) of the cathode separator 6B is set to be higher than that of the portion 26B, the peripheral portion 16B being opposed to (overlapping) the inner periphery of the reinforcing member 13 when viewed from the thickness direction of the cathode separator 6B. With this, a part of the cooling water flowing through the cooling water channel 10 can be supplied to the cathode electrode 4B. The cooling water supplied to the cathode electrode 4B moves toward the polymer electrolyte membrane 1 by an action, such as the capillary action.

With this, the hydrogen peroxide generated by the cross leakage of the reactant gas at the portion, opposed to (overlapping) the inner periphery of the reinforcing member 13, of the polymer electrolyte membrane 1 is dissolved in the cooling water supplied to the cathode electrode 4B. Thus, the hydrogen peroxide can be moved to a position away from the polymer electrolyte membrane 1. Therefore, the radicals generated from the hydrogen peroxide can be prevented from attacking the polymer electrolyte membrane 1. Thus, in the fuel cell 100 according to Embodiment 2, the durability of the polymer electrolyte membrane 1 can be improved, and the decrease in the cell performance can be suppressed.

Modification Example 1

Next, a modification example of the fuel cell 100 according to Embodiment 2 will be explained.

Figure 5:
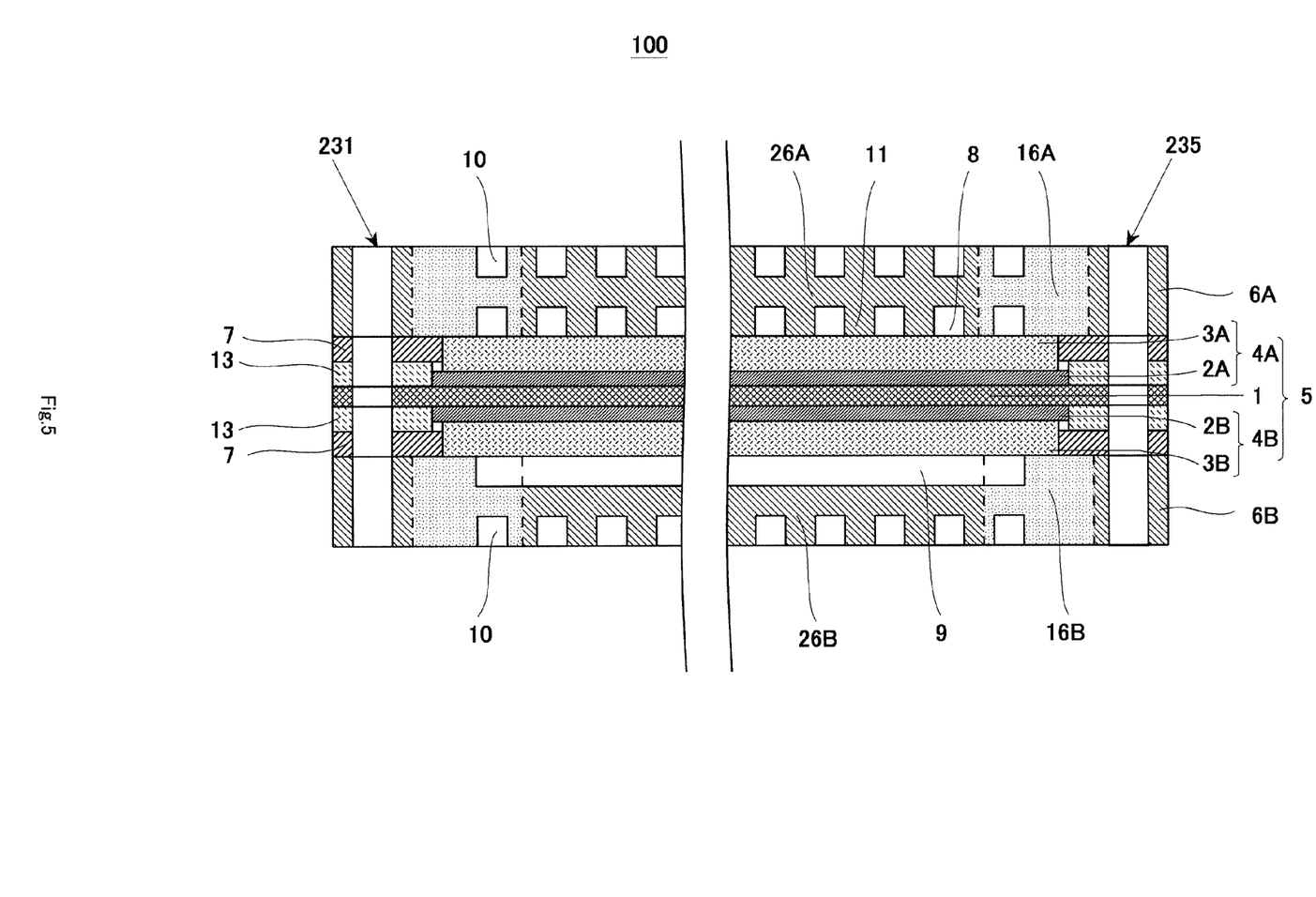
FIG. 5 is a cross-sectional view schematically showing a schematic configuration of the fuel cell of Modification Example 1 of Embodiment 2.

FIG. 5 is a cross-sectional view schematically showing a schematic configuration of the fuel cell of Modification Example 1 of Embodiment 2.

As shown in FIG. 5, in the fuel cell 100 of Modification Example 1, each of the reinforcing members 13 is arranged so as not to overlap the anode catalyst layer 2A or the cathode catalyst layer 2B when viewed from the thickness direction of the anode separator 6A.

The fuel cell 100 of Modification Example 1 configured as above also has the same operational advantages as the fuel cell 100 according to Embodiment 2.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention. In addition, various inventions can be made by suitable combinations of a plurality of components disclosed in the above embodiments.

INDUSTRIAL APPLICABILITY

The polymer electrolyte fuel cell of the present invention can improve the durability while suppressing the deterioration of the polymer electrolyte membrane and can suppress the performance deterioration of the fuel cell. Therefore, the polymer electrolyte fuel cell of the present invention is useful in the field of fuel cells.

REFERENCE SIGNS LIST 1 polymer electrolyte membrane
2A anode catalyst layer
2B cathode catalyst layer
3A anode gas diffusion layer
3B cathode gas diffusion layer
4A anode electrode
4B cathode electrode
5 MEA (Membrane-Electrode Assembly)
6A anode separator
6B cathode separator
7 gasket
8 fuel gas channel
9 oxidizing gas channel
10 cooling water channel
11 first rib portion
12 second rib portion
13 reinforcing member
16A peripheral portion
16B peripheral portion
26A portion
26B portion
61 fuel cell stack
62 cell stack body
63 end plate
64 end plate
100 fuel cell
131 fuel gas supply manifold
132 fuel gas discharge manifold
133 oxidizing gas supply manifold
134 oxidizing gas discharge manifold
135 cooling water supply manifold
136 cooling water discharge manifold
231 fuel gas supply manifold hole
235 cooling water supply manifold hole

The invention claimed is:
1. A polymer electrolyte fuel cell comprising:
a membrane-electrode assembly including a polymer electrolyte membrane and a pair of electrodes sandwiching the polymer electrolyte membrane, the pair of electrodes including a first electrode and a second electrode; and
a pair of separators each having a plate shape and electrical conductivity, the pair of separators including a first separator and a second separator, wherein:
at least the first separator includes an annular peripheral portion and a portion other than the annular peripheral portion,
the annular peripheral portion of the first separator comprises a region located on an inner side of an outer periphery of the first separator and has an annular shape when viewed from a stacking direction of the membrane-electrode assembly and the pair of separators, and
a porosity of the annular peripheral portion of the first separator is higher than a porosity of the portion other than the annular peripheral portion of the first separator.

2. The polymer electrolyte fuel cell according to claim 1, wherein:
at least the first electrode includes a catalyst layer and a gas diffusion layer,
groove-shaped reactant gas channels and rib portions are located on at least one of one main surface of the first separator and one main surface of the gas diffusion layer, each of the rib portions being located between the groove-shaped reactant gas channels, the one main surface of the first separator contacting the gas diffusion layer, and the one main surface of the gas diffusion layer contacting the first separator, and
a groove-shaped water channel is located on the other main surface of the first separator.

3. The polymer electrolyte fuel cell according to claim 2, wherein:
an outer periphery of the first electrode is located on the inner side of the outer periphery of the first separator when viewed from the stacking direction; and
an outer periphery of the annular peripheral portion of the first separator is located between the outer periphery of the first separator and the outer periphery of the first electrode, and an inner periphery of the annular peripheral portion of the first separator is located between the outer periphery of the first electrode and a rib portion closest to the outer periphery of the first electrode.

4. The polymer electrolyte fuel cell according to claim 2, wherein:
an outer periphery of the first electrode is located on the inner side of the outer periphery of the first separator when viewed from the stacking direction, and
an outer periphery of the annular peripheral portion of the first separator is located between 5 mm outside from the outer periphery of the first electrode and the outer periphery of the first electrode, and an inner periphery of the annular peripheral portion of the first separator is located between the outer periphery of the first electrode and 5 mm inside from the outer periphery of the first electrode when viewed from the stacking direction.

5. The polymer electrolyte fuel cell according to claim 2, wherein a part of the water channel overlaps the annular peripheral portion of the first separator when viewed from the stacking direction.

6. The polymer electrolyte fuel cell according to claim 1, further comprising a reinforcing member, wherein:
the reinforcing member is located on a peripheral edge portion of the polymer electrolyte membrane when viewed from the stacking direction.

7. The polymer electrolyte fuel cell according to claim 6, wherein a part of the reinforcing member contacts one main surface of the catalyst layer, which is not in contact with the polymer electrolyte membrane, and overlaps the catalyst layer when viewed from the stacking direction.

8. The polymer electrolyte fuel cell according to claim 6, wherein the reinforcing member does not have an overlap portion on the catalyst layer when viewed from the stacking direction.

9. The polymer electrolyte fuel cell according to claim 6, wherein the reinforcing member is resin.

10. The polymer electrolyte fuel cell according to claim 1, wherein the first separator includes a through hole located on the annular peripheral portion of the first separator and penetrating in the stacking direction.

11. The polymer electrolyte fuel cell according to claim 1, wherein:
each of the separators includes a central portion;
the central portion of the first separator is a region including a portion located on the inner side of the annular peripheral portion of the first separator when viewed from the stacking direction; and
the porosity of the annular peripheral portion of the first separator is higher than a porosity of the central portion by 5% or more.

* * * * *